United States Patent [19]

Vasishth et al.

[11] 4,225,477

[45] Sep. 30, 1980

[54] CONTROL OF RECOATING TIME FOR WATER DILUTABLE ALKYD SURFACE COATING COMPOSITIONS

[75] Inventors: Ramesh C. Vasishth, Danville; Robert S. Wang, Concord, both of Calif.

[73] Assignee: Envirosol Systems International, Ltd., Orinda, Calif.

[21] Appl. No.: 956,126

[22] Filed: Oct. 30, 1978

[51] Int. Cl.$^2$ .................................................. C08J 3/00
[52] U.S. Cl. ........................ 260/29.2 TN; 260/29.2 E; 427/385 R; 427/393; 427/428; 427/429
[58] Field of Search ................... 427/397, 385 R, 154, 427/155, 156, 393, 428, 429; 428/425; 260/29.2 TN, 29.2 E

[56] References Cited

U.S. PATENT DOCUMENTS

| | | | |
|---|---|---|---|
| 3,087,835 | 4/1963 | Auer | 427/397 |
| 3,639,315 | 2/1972 | Rodriguez | 260/29.2 TN |
| 3,752,778 | 8/1973 | Dhein et al. | 260/29.2 TN X |
| 4,029,831 | 6/1977 | Daunheimer | 427/385 R X |
| 4,071,514 | 1/1978 | Ribbecke et al. | 260/29.2 TN |

*Primary Examiner*—Ronald H. Smith
*Assistant Examiner*—Thurman K. Page
*Attorney, Agent, or Firm*—Townsend and Townsend

[57] ABSTRACT

Duration of the initial interval when a clear varnish can be recoated without wrinkling can be changed, the varnish being a water dilutable alkyd resin formulation in a water-organic polar solvent system. The recoating interval is changed by changing the weight ratio of water to organic polar solvent in the solvent system, with increases in the weight ratio of water to organic polar solvent causing increases in the duration of the interval and decreases in the weight ratio providing decreases therein. Compositions utilizing the above method having increased duration of the initial recoating interval are described.

9 Claims, No Drawings

CONTROL OF RECOATING TIME FOR WATER DILUTABLE ALKYD SURFACE COATING COMPOSITIONS

This invention relates to water dilutable alkyd surface coating compositions and to a method for changing the duration of the initial interval when such a composition can be recoated without wrinkling.

Most water dilutable modified or unmodified alkyds are supplied as solutions of alkyd polymers in a strong polar solvent such as propasol (propoxy propanol), butyl cellosolve (ethylene glycol monobutyl ether), butyl carbitol (diethylene glycol monobutyl ether) or a mixture of polar solvents. The alkyds are generally supplied at 60 to 75% concentration.

Relative to conventional hydrocarbon solvent soluble alkyds which have acid numbers of near zero to about ten, the water dilutable alkyds have acid numbers above about twenty, generally between 30 and 60. Because of their higher acidity they can be further reacted with amines or ammonia to give them water dilutability.

Air drying clear varnishes can be made from these water dilutable alkyds by adding suitable driers, such as cobalt, zirconium and maganese naphthenates. However, at 60 to 75% solids concentration, these varnishes are too viscous to apply by conventional means such as brushing or roller coating. In order to reduce their viscosity they can be diluted by further addition of polar solvents or an ammoniacal aqueous solution, or a mixture of the two. Suitable brushing viscosities are thus obtained at concentrations of 25 to 40%.

In many applications it is desirable to use more than one coat of the varnish. This gives added dry film thickness and better protection, while at the same time enhancing the appearance of the varnished surface. When more than one coat has to be applied it is necessary to apply the second coat at a suitable time after the first coat has been applied; otherwise the application of the second coat results in wrinkling. As an example, a particular varnish may be recoated within 5 to 10 hours of the application of the first coat. If the second coat is applied between 10 and 28 hours of the application of the first coat, wrinkling may occur. However, after 28 hours the second coat may be applied anytime without causing any wrinkling. Thus, in this particular case there are two key time intervals suitable for recoating, the first between 5 hours and 10 hours, which will be referred to herein as "interval A", and the other anytime after 28 hours of the application of the first coat.

From a practical view point including convenience to the user of the varnish, it is important to be able to control the time periods during which the second coat may be applied without wrinkling. In particular, it is important to be able to extend the first period, interval A.

In the above cited example the time interval, interval A, in which the second coat may be applied is given as 5-10 hours. Moreover, in this case the second coat may be applied anytime after 28 hours. These times vary from alkyd to alkyd, depending upon the nature of the alkyd and the solvent system used.

It was found that by changing the drier level and type, the time interval A could be changed. Thus, if the amount of driers added were reduced the time interval A could be extended. On doing so, however, the varnish dried much slower, that is, remained tacky and soft for a long period. This is undesirable. When the varnish dries too slowly, it is apt to attract dust, thus marring its appearance. Moreover, a varnished surface cannot be put to use unless the varnish has achieved a certain degree of hardness.

Efforts to achieve the same affect without changing the drying time by adding a higher boiling solvent, such as butyl carbitol (boiling point 230.6° C.) as compared to butyl cellosolve (boiling point 171.2° C.) or propasol (boiling point 149.8° C.) produced little or no change in the interval A.

Varnishes based upon conventional hydrocarbon soluble alkyds are also prone to wrinkle when thicker coats of varnishes based upon these are applied. It was reasoned that by reducing the solids of the varnish based upon water dilutable alkyds, the film thickness deposited per coat may be reduced somewhat and this may enable control of the interval A. This approach, obviously, would be useful only if the dry film thickness achieved with two coats of lower solids varnish was still considerably more than the dry film thickness of one coat when a higher concentration varnish was used.

These attempts led to some surprising and unexpected results.

It was found that diluting the varnish with the polar organic solvent alone or with a combination of polar organic solvent and water did not result in any significant change in the interval A. Actually, when the varnish was diluted below a certain critical solids concentration, its flow properties were drastically affected. Varnishes with solids concentration below this critical concentration would not wet out on the first coat and would form "puddles" or discontinuities in the coating.

In accordance with the present invention it was discovered that the interval A, or the initial interval when the surface coating compositions of this invention could be recoated without wrinkling, can be changed by changing the weight ratio of the water to the organic polar solvent present in the solvent system for the water dilutable alkyd resin. The solvent system may be formed with one organic solvent or a mixture of organic solvents. It was found that increases in the weight ratio of water to organic solvent provide increases in the duration of the initial wrinkle-free recoating interval, and decreases in the weight ratio provided decreases in the initial wrinkle-free recoating interval.

The novel protective coating compositions provided by this invention thus can be formulated to have a convenient recoating time as desired and comprise: a water dilutable alkyd resin; drier for said resin; at least one organic polar solvent for said resin; and water; the weight ratio of water to organic solvent being sufficiently high to increase the duration of the initial interval when recoating without wrinkling of the coatings may be executed, but insufficiently high to cause resin precipitation out of solution or discontinuities in the coating.

In the preferred embodiment a clear varnish is formulated and it has been found that when the weight ratio of water to organic solvent is at least about 2.9 to 1.0 the initial recoating interval is increased over prior art formulations. Usually, the weight ratio of water to organic solvent will be higher than 3.0 or 4.0 to 1.0, and preferably will be higher than 5.0 to 1.0.

These findings which provide increased initial recoating intervals are compared with the closest known prior art which is a water dilutable alkyd varnish that has been prepared by Cargill, Inc. These known formulations were prepared from a concentrate having 75% solids content. A formulation having 30% solids was obtained by diluting the concentrate with a weight ratio of water to organic solvent of 80/20. In contrast, the present compositions may start with similar concentrates of water diluted alkyd resins, but accomplish the dilution with water alone and thereby provide formulations containing a higher proportion of water in the solvent system.

In accordance with the present invention it has further been discovered that the maximum time duration for the initial interval for recoating without wrinkling is obtained when the weight ratio of water to organic solvent is substantially at the limit beyond which further increments in the water concentration would result in resin precipitation out of solution or discontinuities (puddling) in the coating. In one preferred embodiment in which the polar organic solvent is butyl cellosolve it has been found that the point at which discontinuities occur is when the weight ratio of water to organic solvent is 6 to 1. Therefore, the maximum length of the initial interval for recoating is obtained with a weight ratio of water to organic solvent which is slightly less than 6 to 1.

It should be noted that the particular water to solvent ratio limit where precipitation out of solution or discontinuities in the coating occur will differ for different solvent systems and alkyd resins. Nonetheless, each system selected will provide the maximum initial recoating interval where the water to solvent ratio approaches such a critical limit.

The length of the initial recoating interval is also dependent upon the ambient temperature and humidity, with increased humidity increasing the initial recoating interval period. In all of the experimental work reported in this application the temperature was 70°±5° F. and 45±5% relative humidity.

The present compositions contemplate formulations containing any desired solids content. For most applications, particularly where it is desired to brush or roller coat the composition, the solids content of the composition will be about 25 to 40% on a weight to volume basis.

Apart from the novel adjustment of water in the water-organic solvent system, all other components of the present surface coating compositions including the alkyd resins and driers are conventional. The following experimental work will illustrate the invention. Examples I, II and III describe varnish formulations which are used in the experiments described in Examples IV, V and VI.

EXAMPLE I

This example illustrates a typical procedure for making a varnish from a water dilutable alkyd. The driers used are in normal amounts for products of this type.

|  | Parts by Weight |
|---|---|
| #7407 water dilutable alkyd in Propasol P. (supplied by Cargill, Inc.) at 80% solids | 340 |
| Ammonium hydroxide (28%) | 26 |
| Butyl cellosolve | 30 |
| Deionized water | 482 |
| Mix thoroughly, then add: |  |
| Tinuvin P Paste (U.V. absorber) | 7 |
| Mix until solution is free of undissolved particles, and add: |  |
| Cobalt naphthenate 6% (drier) | 5 |
| Zirconium Drier 12% | 3 |
| Activ-8 (drier) | 3 |
| Super Ad-it (bacerticide) | 1 |
| BYK 301 (wetting agent) | 2.8 |
| Butyl cellosolve | 10 |
|  | 909.8 |

The above varnish has a solids concentration of 30%.
Interval A: 5–15 hours.
Wrinkling Time: 16–28 hours.
Water to Solvent Weight Ratio: 4.6:1.

EXAMPLE II

This example also illustrates a typical procedure for making a varnish from a water dilutable alkyd. The driers used are half the normal amount for products of this type.

|  | Parts by Weight |
|---|---|
| #7407 water dilutable alkyd in Propasol (supplied by Cargill, Inc.) at 80% solids | 340 |
| Ammonium hydroxide (28%) | 26 |
| Butyl cellosolve | 30 |
| Deionized water | 482 |
| Mix thoroughly, then add: |  |
| Tinuvin P paste (U.V. absorber) | 7 |
| Mix until solution is free of undissolved particles, then add: |  |
| Cobalt naphthenate 6% (drier) | 2.5 |
| Activ-8 (drier) | 1.5 |
| Zirconium naphthenate 12% | 1.5 |
| Super Ad-it (bactericide) | 1 |
| BYK 301 (wetting agent) | 2.8 |
| Butyl cellosolve | 10 |
|  | 904.3 |

N.V.: 30%.
Interval A: 5–24 hours.
Wrinkling time: 25–35.
Water:Solvent Weight Ratio: 4.6:1.

EXAMPLE III

This example illustrates a typical procedure for making a varnish from a water dilutable urethane modified alkyd. Normal amounts of driers, as per Example I, were used.

| Material | wt/gms |
|---|---|
| Add in order: |  |
| Urethane mod. water dilutable alkyd, 70% in butyl cellosolve (XP4366, Spencer-Kellog) | 354 |
| Ammonium hydroxide (28%) | 15 |
| Deionized water | 424 |
| Mix thoroughly, then add: |  |
| Butyl cellosolve | 30 |
| Cobalt hydrocure (drier) (Mooney) | 1 |
| Manganese hydrocure (drier) (Mooney) | 1 |
| Activ-8 (drier) | 0.45 |
| L-5310 (20% in butyl cellosolve) (wetting agent) | 1.5 |
| Mix thoroughly, adjust pH to 8.5 |  |
|  | 826.95 |

N.V.: 30%.
Interval A: 5–17 hours.
Wrinkling time: 18–32 hours.

Weight Ratio of Water to Cellosolve: 3.2:1.

EXAMPLE IV

This example compares the varnishes of Examples I and II, showing the effect of changing the drier amount on "wrinkle time" on recoating and on the drying time of the varnishes.

Two 2'×3' plywood panels were coated with a conventional clear sealer, allowed to dry for four hours and then lightly sanded.

The panels were then coated with varnishes of Example I and Example II. Three hours later, when the panels were dry to touch, they were divided into 40 squares each, each square clearly marked and separated by using a masking tape. To these squares was applied to second coat, different squares receiving a second coat at one hour intervals, starting with ten hours elapsed time after the initial coat was applied. Varnish of Example I and varnish of Example II were thus compared on these two separate panels. The time at which the application of the second coat resulting in wrinkling was noted. The time was measured from the time the first coat was applied.

The results are reported below:

|  | Driers Used | Wrinkle Time on Recoat (hrs.) | Touch Dry Time (hrs.) | Through Dry Time* (hrs.) |
|---|---|---|---|---|
| Varnish I (see Example I) | Normal Amount | 16 | 2 | 16 |
| Varnish II (see Example II) | Half of Normal Amount | 25 | 4 | 24+ |

*Dry Times were determined using a Gardner Circular Dry Time Recorder

From the above it will be seen that reduction in drier level increased interval A but undesirably increased drying time.

EXAMPLE V

This example shows the effect of type of diluent used and its concentration on the "wrinkle time" on recoating.

The "wrinkle time" on recoating for each varnish was determined on separate panels as in Example IV. The results are given in the following example. The formulation employed has the composition of Example I with reduction in solids content being accomplished with addition of the listed diluents.

| Diluent Added | % of N.V. | Water: Organic Solvent Ratio | Wrinkle Time on Second Coat (hr.) |
|---|---|---|---|
| (a) None | 30 |  | 12 |
| (b) $\frac{20}{80} = \frac{\text{butyl cellosolve}}{\text{water}}$ | 28 |  | 13 |
| (c) Water alone | 28 | 5.22 | 18 |
|  | 27 | 5.55 | 24 |
|  | 26 | 5.91 | 32 |
|  | 25 | 6.30 | 48 |
|  | 24 | 6.72 | 60+ |
|  | 23 | 7.18 | wetting problem |

EXAMPLE VI

This Example was carried out in the same manner as Example V except that the formulation employed has the composition of Example III. The results are as follows.

| Diluent Added | Concentration (wt.%) | Wrinkle Time on Second Coat (hrs.) |
|---|---|---|
| (a) None | 30 | 16 |
| (b) Butyl carbitol | 28 | 16 |
| (c) Butyl cellosolve | 28 | 16 |
|  | 23 | wetting problem |
| (d) $\frac{20}{80} = \frac{\text{butyl cellosolve}}{\text{water}}$ | 28 | 18 |
|  | 24 | 20 |
| (e) Water alone | 28 | 24+ |
|  | 27 | 36+ |
|  | 26 | 40+ |
|  | 25 | 60+ |
|  | 24 | wetting problem |

From the above Examples V and VI it will be seen that increasing water concentration increased the "wrinkle time" on recoating until the critical limit was reached.

It is also to be noted from Examples V and VI that some formulations may have succeeded in lengthening the "wrinkle time" to such an extent (more than 60 hours) that these formulations may no longer have a "wrinkle time" and may be recoatable at any time after becoming touch dry. In these cases interval A or the initial interval for recoating without wrinkling may be infinite.

We claim:

1. A protective coating composition having a convenient recoating time comprising: a water dilutable alkyd resin; drier for said resin; at least one organic polar solvent for said resin; and water; the weight ratio of water to organic solvent being sufficiently high to increase the duration of the initial interval when recoating without wrinkling of the coating may be executed, but insufficiently high to cause resin precipitation out of solution or discontinuities in the coating, the weight ratio of water to organic solvent being at least about 5.0 to 1.0.

2. A protective coating composition in accordance with claim 1 wherein the weight ratio of water to organic solvent is substantially at the limit beyond which resin precipitation out of solution or discontinuities in the coating occur whereby substantially a maximum duration of the initial recoating interval is obtained.

3. A protective coating composition in accordance with claims 1 or 2 wherein the solids content of the composition is about 25–40%.

4. A protective coating composition in accordance with claim 1 wherein said alkyd resin is urethane modified.

5. A protective coating composition in accordance with claims 1 or 2 wherein said organic solvent is selected from butyl carbitol, butyl cellosolve, and propasol.

6. A protective coating composition in accordance with claim 2 wherein said organic solvent is butyl cellosolve.

7. A protective coating composition in accordance with claim 6 wherein the weight ratio of water to organic solvent is slightly less than 6 to 1.

8. A method for changing the duration of the initial interval when a clear varnish can be recoated without wrinkling, said clear varnish containing a water dilutable alkyd resin in a water-organic polar solvent system, said method comprising changing the weight ratio of water to organic polar solvent in said solvent system such that said weight ratio is sufficiently high to increase the duration of said interval, but insufficiently high to cause resin precipitation out of solution or discontinuities in the coating, said weight ratio being at least about 5.0 to 1.0, wherein increases in said weight ratio provide increases in the duration of said interval and decreases in said weight ratio provide decreases therein.

9. A method in accordance with claim 8 wherein said weight ratio of water to organic polar solvent is increased to increase the duration of said interval.

* * * * *